Aug. 4, 1925.

W. M. ROBERTS 1,548,330

MOLD

Filed Aug. 30, 1921

INVENTOR
Webster M. Roberts,

ATTORNEYS

Aug. 4, 1925.　　　　　　　　　　　　　　　1,548,330
W. M. ROBERTS
MOLD
Filed Aug. 30, 1921　　　　4 Sheets-Sheet 2
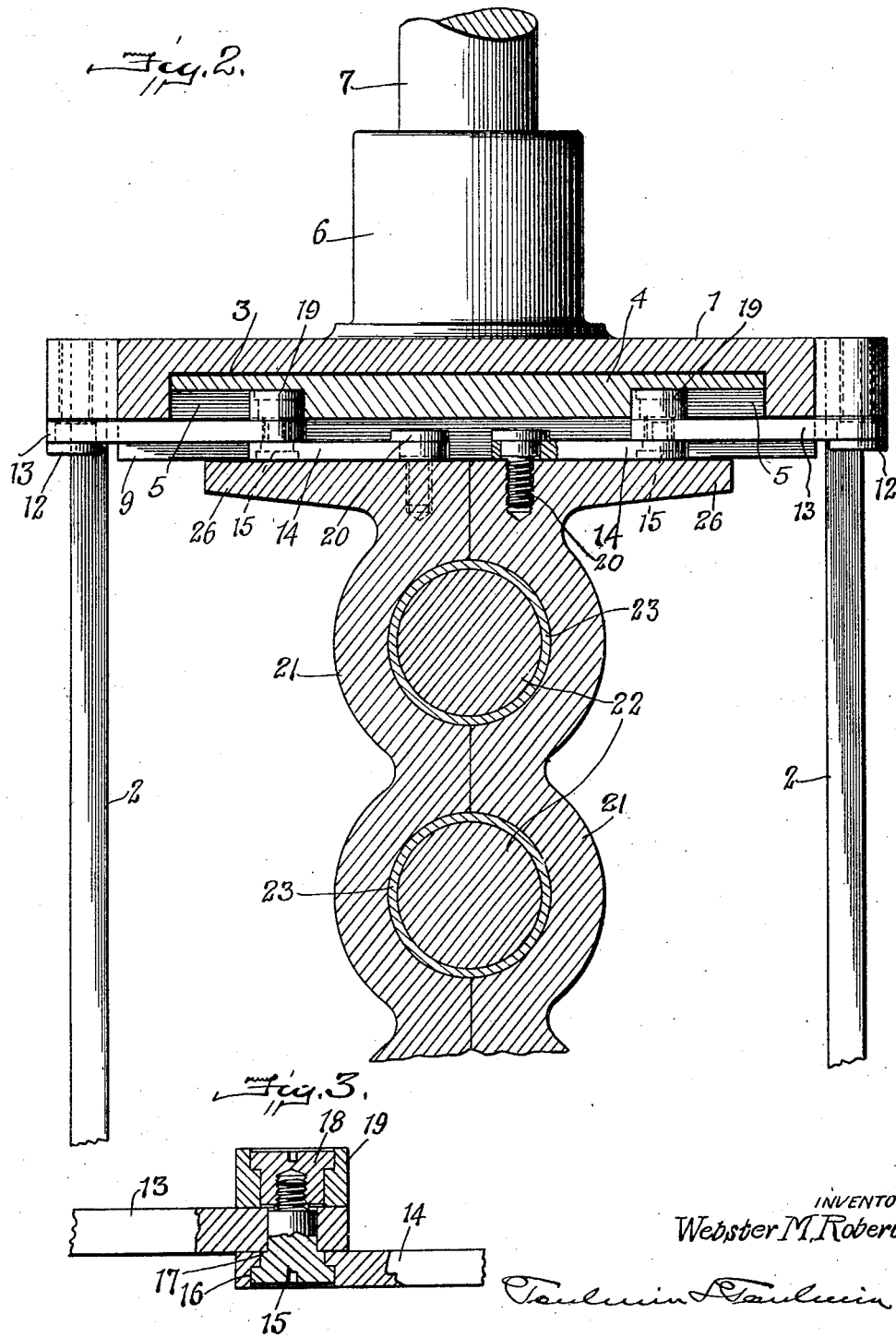
INVENTOR
Webster M. Roberts,
ATTORNEYS

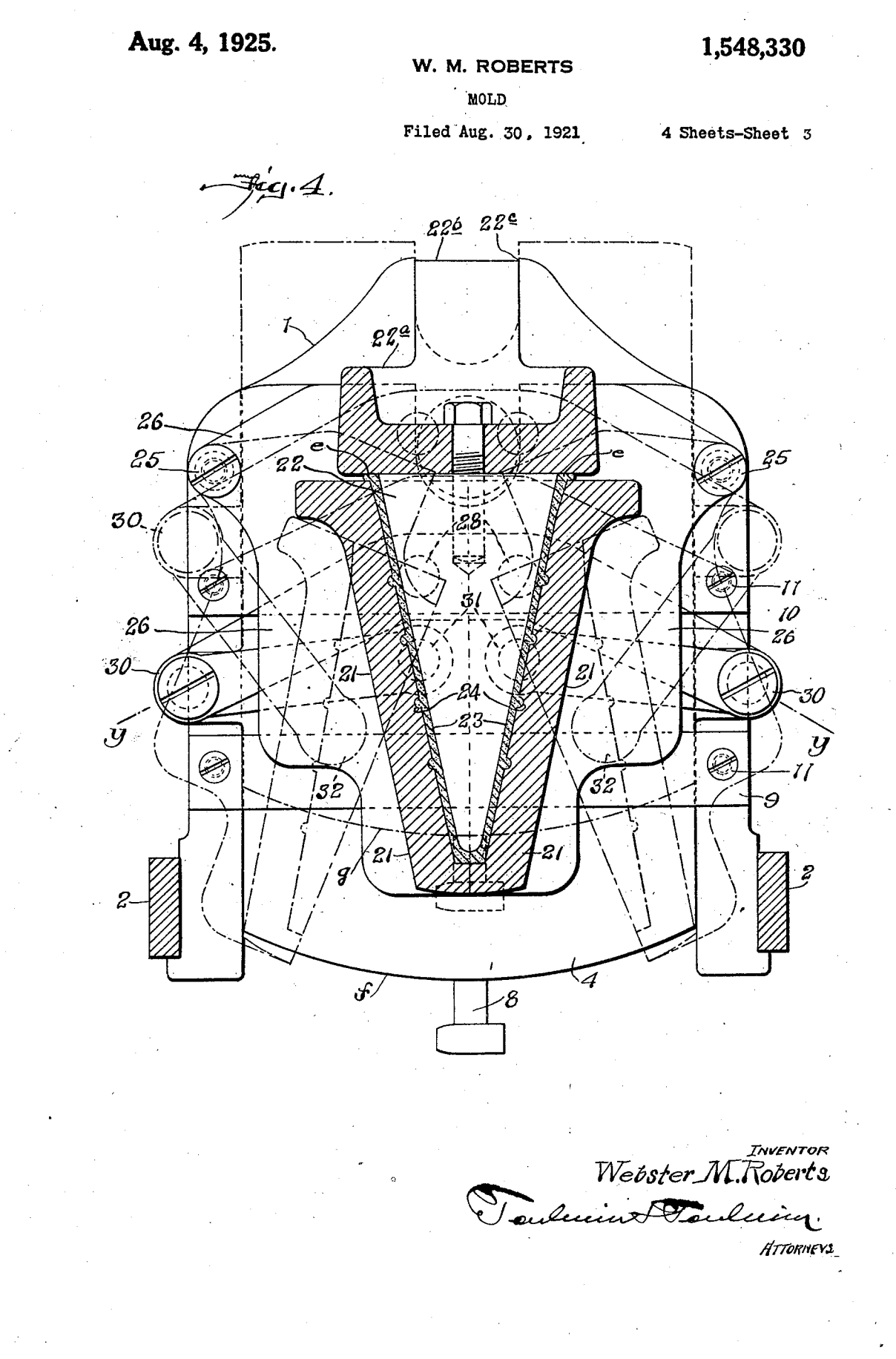

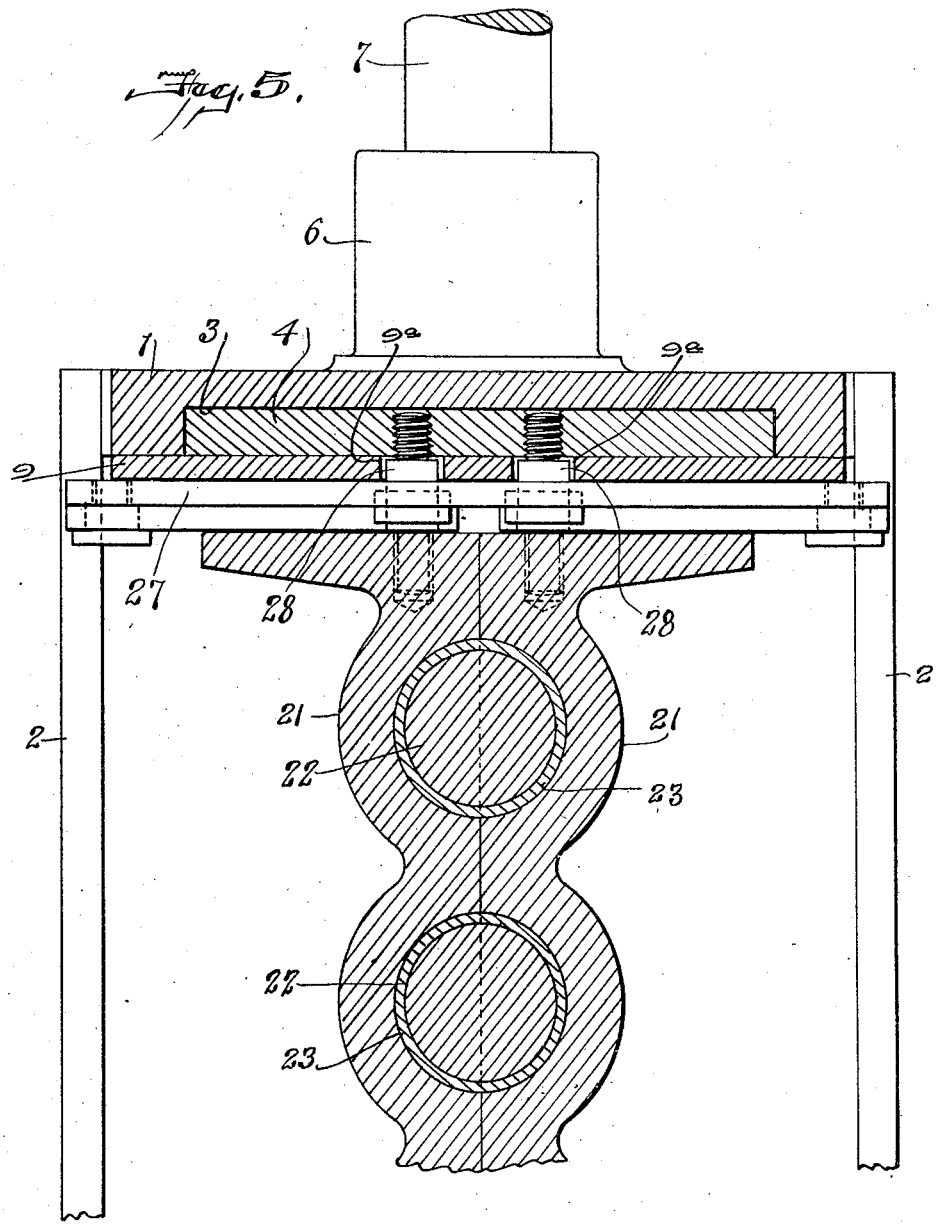

Patented Aug. 4, 1925.

1,548,330

UNITED STATES PATENT OFFICE.

WEBSTER M. ROBERTS, OF ST. JOSEPH, MISSOURI, ASSIGNOR TO ROBERTS CONE MANUFACTURING COMPANY, OF ST. JOSEPH, MISSOURI, A CORPORATION OF MISSOURI.

MOLD.

Application filed August 30, 1921. Serial No. 496,858.

*To all whom it may concern:*

Be it known that I, WEBSTER M. ROBERTS, a citizen of the United States, residing at St. Joseph, in the county of Buchanan and State of Missouri, have invented certain new and useful Improvements in Molds, of which the following is a specification, reference being had therein to the accompanying drawing.

This invention relates to an improvement in molds, which in conjunction with cores are used for the purpose of producing what is known as batter cones—a confectionery product in the nature of a thin, crisp well-cooked and sweetened article used by ice cream venders in the sale of ice cream at retail.

The particular object in view is that of constructing and organizing the mold in halves, each half controlled by toggle mechanism, so that by one movement of the mold halves are locked together to receive the batter and to go through the baking operation and by another movement the mold halves are opened or separated from one another so that the product or cone will be instantly freed and allowed to drop out of the mold; the opening operation being preceded by the withdrawal of the cores which have performed the office of fashioning the interior of the cones.

This combination of mold halves and toggle mechanism produces a very practical and positively acting mechanism which is dependable alike for holding the mold halves together and for separating them into open position and returning them into closed position.

In the accompanying drawings;

Fig. 2 is a partial plan view and sectional view taken on the line x—x of Fig. 1;

Fig. 3 is a detail view showing one manner of connecting the toggle arms together;

Fig. 4 is a like view to Fig. 1, showing a modified form;

Fig. 5 is a like view to Fig. 2, taken on the line y—y of Fig. 4, showing this modified form.

Figure 1:
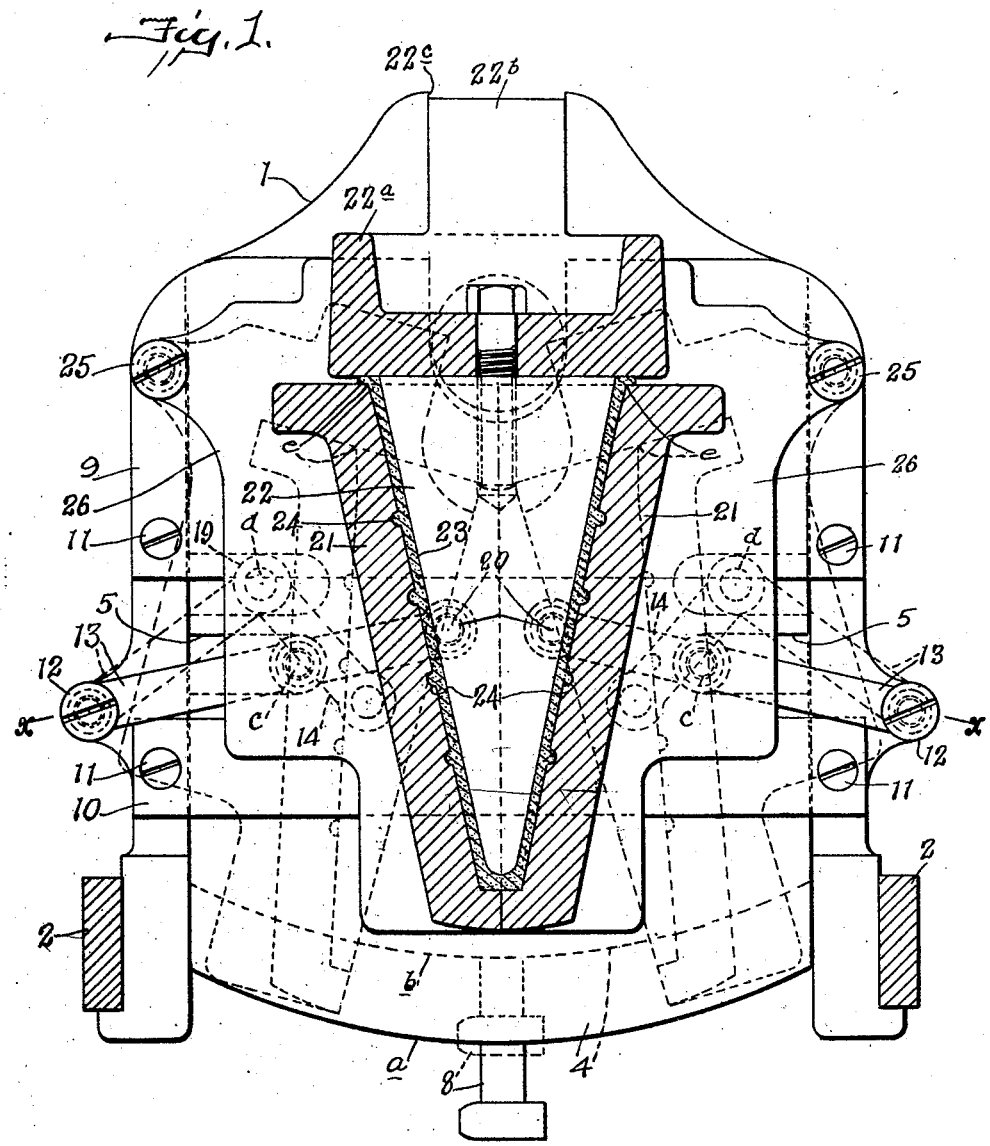
Fig. 1 is a partial elevation and vertical sectional view of a mold structure embodying our invention.

I will first refer to what may be called a frame structure in which the separable mold is to be mounted. This structure comprises an end plate 1, of which there are two, both alike, connected together by side bars 2. These end plates 1 are deeply recessed at 3, as shown in Figs. 2 and 5, so that they may receive, and form a guide for, the slidable plates 4 in which are formed grooves 5 adapted to act on the toggle mechanism, as will presently appear.

The end plates 1 each carry a stud 6, one of which is shown in Figs. 2 and 5, and which studs are engaged by a suitable locking arm employed to hold the mold structure stationary at the time that the molds are to be opened for the discharge of the product and closed for a new supply of batter. The locking arm and adjunct parts employed for thus holding the mold structure are not shown herein but are fully set forth in earlier applications by myself and coinventor, as for instance, application, Ser. No. 443,063, filed February 7th, 1921. Projecting from the stud 6 is a roller bearing 7 on which is to be mounted the roller which travels on the track that carries the mold structure, as also disclosed in said copending application.

Referring now more particularly to the subject matter of the present invention, it will be understood that each sliding plate 4 has a projection 8 by which it can be raised and lowered and made to slide in its head plate 1 to retain the sliding plate in place in the way of the head plate. Two bands or strips 9 and 10, as best seen in Fig. 1, are secured to the head plate, as by screws 11. And to each head plate is pivoted, as by a screw or bolt 12, a link 13. The other end of each outer link 13 connects with an inner link 14, as by such connection as is shown in Fig. 3. A screw 15, whose head is shouldered, as seen at 16 and 17, is threaded into a hollow plug 18 extended through the arm 13 and through a roller 19, the roller being recessed to receive the head of this plug. In this way a convenient means is afforded for connecting the two links pivotally together, though other means may be employed. This construction also affords a convenient bearing for the roller 19 which travels in the slot 5 before referred to.

The other end of each link 14 is pivotally connected to one of the mold halves by means of screws 20 which pass through the links and screw into the mold halves, as seen in Fig. 2.

The mold halves each comprise a part 21 having each a partial cavity so that when the two halves are put together the cavities form conical openings into each of which fits a core 22 of like shape but reduced size to leave an intervening space to be filled in by the batter which is to compose the product or cone, as indicated at 23. The interior of each cavity has recesses 24 into which the batter flows to form exterior beads or other ornamental surfaces on the cones, as also to incidentally interlock the cones with the mold halves to hold the cones while the cores are being withdrawn should there be a tendency of the cones to stick to the cores. These cores are carried by a core bar 22$^a$ whose extreme outer portions 22$^b$ are adapted to fit and slide in the ways 22$^c$ formed in the upper part of the head plates 1.

It will now be seen that if the sliding plates 4 are elevated from the full line position shown in Fig. 1 to the dotted line position, that is, from $a$ to $b$, the intermediate joints in the toggles comprised of the links 13 and 14 being lifted from the position $c$ to the position $d$, (Fig. 1) and in doing so the rollers 19 will travel in the grooves 5. By these movements the mold halves 21 will swing apart, each half turning on its pivot 25 comprised of a screw or other device pivotally connecting the flange portion 26 of the mold half to the frame structure comprised of the parts 1, 2 and 9.

When the mold halves are thus swung from their full line to their dotted line position the edges $e$ will drop down and move outward, as seen by comparing the full line and the dotted line positions thereof in Fig. 1. In the dotted line or open position the halves stand far enough apart to open the cavities enough to admit of the descent of the cones through and from the molds. When the movement of the slide plates 4 is reversed the mold halves will return to closed position through the reverse movements of the toggle links. When in the latter position the center pivot or point $c$ is slightly below a straight line projected from the center of the pivots 12 and 20, so as to lock the toggles to cause them to hold the mold halves against accidental opening. Any tendency to so open causes a slight downward thrust of the roller 19 against the bottom wall of the groove 5.

Referring now to Figs. 4 and 5 it will be seen that I have illustrated a modification or modified form in respect to the toggles. In this modified form I provide a toggle member in the form of a yoke 27, one at each end of the structure. These yokes are attached to the sliding plate 4 by means of studs 28, more clearly seen in Fig. 5, and shown also in dotted lines in Fig. 4.

The strip 9 is slotted at 9$^a$ to permit the studs 28 to travel up and down with the plate 4. Therefore, whenever the plates 4 are moved from the full line position indicated in Fig. 4 at $f$ to the dotted position indicated in that figure at $g$, these yokes will be elevated from their lower full line position shown in Fig. 4 to their upper dotted line position. The effect of this movement is to open or spread apart the mold halves 21 from the full line position shown in Fig. 4 to the dotted line position therein shown. To effect this movement of the mold halves links 29 are pivoted at 30 to the yoke 27 and are pivotally connected at 31 to the mold halves.

When the plates 4 and the yokes 27 are in their lower or normal position the links 26 stand in a nearly horizontal position, as shown in Fig. 4, but when the plate and the yokes 27 are elevated the pivots 30 draw on the outer ends of the links 26 and cause the links to pull on the mold halves, which, being pivoted at the points 25, will swing downward as well as outward and carry the pivots 31 from their upper to their lower outer positions 32, as shown by the dotted lines in Fig. 4.

Then to close the mold halves the plate 4 is lowered, causing the yokes 27 to press downward on the links 26, having the effect of thrusting their lower ends inward and upward from the position shown at 32 back to their former or normal position.

As the mold halves cannot open, as by pressure, except by passing the pivots 31 below the pivots 30 which connect the links with the yoke 27, and as this crossing of the centers cannot take place until the yokes 26 are elevated, the mold halves are therefore normally locked by this toggle effect.

Thus it will be seen that both in the first and modified forms the principle of the toggle effect is carried out, in the former case through the instrumentality of a pair of links for each mold half and in the latter case through a single link for each mold half and the connection, as by the yokes 27, of the links with the sliding plate 4. Both forms are effective and simple in construction and mode of operation.

As the mold halves open in the manner above stated they withdraw themselves from the cones and allow the latter to drop out, whether the cores are then partially or wholly removed from the interior of the cones, a matter depending upon the preferred mode of manipulating the cores with respect to the cones when the discharge operation of the cones is to take place.

Thus it will be seen that I have provided a very positive construction and a very feasible and effective mode of operation for opening and closing and maintaining opened and closed the mold halves.

Having thus fully described my invention, what I claim as new and desire to secure by Letters Patent, is:—

1. The combination, with a mold structure comprising end plates having ways, of slidable plates mounted in said ways, separable mold halves, toggle arms pivoted to said structure, to the mold halves and to each other, and a connection between the links and the slidable plates, whereby the toggles may be operated to open and close the mold halves and to hold the halves in closed and open positions.

2. The combination, with a mold structure comprising end plates having ways, of slidable plates mounted each in one of said ways, each plate having a groove, separable mold halves pivoted to the structure, links pivoted to the mold halves, other links pivoted to the structure, and a pivotal connection between the respective sets of links, such connection operating within said slots in the plates, whereby when the slide plates are operated the toggles are made to swing the mold halves on their pivots into closed or open position.

3. In a mold structure, the combination with a longitudinally slidable member guided for vertical sliding movement, and separable mold halves, of toggle mechanism comprising links pivoted to the mold halves and to said sliding member, whereby when said member is in normal position the toggle mechanism locks the mold halves together, when adjusted in one direction they are opened, and when adjusted in the other direction they are closed.

4. The combination of separable mold sections each provided with a series of cavities arranged in parallelism, the cavities of one section being opposed to the cavities of the other section, the cavities being spaced longitudinally of said sections, toggle mechanism pivoted to the mold sections at one end of the toggle and adapted when in one position to hold said mold sections locked together, and when in another position adapted to separate the mold sections and means to operate the toggle mechanism by a movement that will cause said sections to open wider at the lower end of said cavities than at the upper end.

5. The combination of separable mold sections each having a series of cavities arranged in parallelism and spaced longitudinally of the respective sections, the cavities of one section being opposed to the cavities of the other section, said mold sections held by a pivotable support, toggle mechanism pivoted to the mold sections and adapted when the toggle links are extended in a straight line to hold the mold sections locked together, and when the line is broken to separate the mold sections, means to operate the toggle mechanism by a movement that will cause said sections to open wider at the bottom end of said cavities than the upper end thereof.

6. The combination of separable mold sections having cavities, toggle mechanism connected to the mold sections and adapted when in one position to hold the mold sections locked together, and when in another position adapted to separate the mold sections the same amount throughout their length, said sections opening wider at one end of said cavities than the other, cores for said cavities, said cores secured to a core bar and movable into and out of said molds in downward and upward directions respectively while maintaining a parallel relation to said mold sections.

7. The combination of separable mold sections having cavities, said separable mold sections held by a pivotable support, toggle mechanism connected to the mold sections and adapted when in one position to hold the mold halves locked together and when in another position adapted to separate the mold sections the same amount throughout their length, said sections adapted to open wider at one end of said cavities than at the other, cores for said cavities, said cores secured to a core bar and movable into and out of said molds in downward and upward directions respectively, while maintaining a parallel relation to said mold sections.

In testimony whereof, I affix my signature.

WEBSTER M. ROBERTS.